(12) United States Patent
Senga et al.

(10) Patent No.: US 8,962,194 B2
(45) Date of Patent: Feb. 24, 2015

(54) LITHIUM ION CONDUCTING SULFIDE BASED CRYSTALLIZED GLASS AND METHOD FOR PRODUCTION THEREOF

(75) Inventors: Minoru Senga, Sodegaura (JP); Yoshikatsu Seino, Sodegaura (JP); Masahiro Tatsumisago, Sakai (JP); Akitoshi Hayashi, Sakai (JP)

(73) Assignees: Idemitsu Kosan Co., Ltd., Tokyo (JP); Masahiro Tatsumisago, Sakai-shi (JP)

( * ) Notice: Subject to any disclaimer, the term of this patent is extended or adjusted under 35 U.S.C. 154(b) by 1456 days.

(21) Appl. No.: 10/586,924

(22) PCT Filed: Jan. 31, 2005

(86) PCT No.: PCT/JP2005/001323
§ 371 (c)(1),
(2), (4) Date: Jul. 24, 2006

(87) PCT Pub. No.: WO2005/078740
PCT Pub. Date: Aug. 25, 2005

(65) Prior Publication Data
US 2007/0160911 A1    Jul. 12, 2007

(30) Foreign Application Priority Data
Feb. 12, 2004  (JP) .................... 2004-035380

(51) Int. Cl.
*H01M 10/36* (2010.01)
(52) U.S. Cl.
USPC .......................................... 429/322; 429/423
(58) Field of Classification Search
USPC ............... 429/304, 322; 423/303, 312
See application file for complete search history.

(56) References Cited

U.S. PATENT DOCUMENTS

2004/0005504 A1*  1/2004  Kugai et al. ................ 429/322

FOREIGN PATENT DOCUMENTS

| JP | 07 330312 | 12/1995 |
|---|---|---|
| JP | 11 144523 | 5/1999 |
| JP | 2002-109955 | * 4/2002 |
| JP | 2002 109955 | 4/2002 |
| JP | 2003 208919 | 7/2003 |
| TW | 200305889 A | 11/2003 |

OTHER PUBLICATIONS

M. Tatsumisago, et al., "New lithium ion conducting glass-ceramics prepared from mechanochemical Li2S—P2S5 glasses". Solid State Ionics 154-155, 2002, pp. 635-640.*
M. Tatsumisago, et al., "New lithium ion conducting glass-ceramics prepared from mechanochemical $Li_2S$—$P_2S_5$ glasses", Solid State Ionics 154-155, 2002, pp. 635-640.
A. Hayashi, et al., "Preparation of $Li_2S$—$P_2S_5$ Amorphous Solid Electrolytes by Mechanical Milling", J. Am. Ceramic Soc., vol. 84, No. 2, pp. 477-479 (2001).

(Continued)

*Primary Examiner* — Alix Eggerding
(74) *Attorney, Agent, or Firm* — Oblon, Spivak, McClelland, Maier & Neustadt, L.L.P.

(57) ABSTRACT

A lithium-ion-conducting sulfide-based crystallized glass including: lithium (Li), phosphorus (P), and sulfur (S) elements, wherein the glass has diffraction peaks at $2\theta=17.8\pm0.3$ deg, 18.2±0.3 deg, 19.8±0.3 deg, 21.8±0.3 deg, 23.8±0.3 deg, 25.9±0.3 deg, 29.5±0.3 deg and 30.0±0.3 deg in X-ray diffraction (CuKα: $\lambda=1.5418$ Å).

18 Claims, 3 Drawing Sheets

(56) References Cited

OTHER PUBLICATIONS

A. Hayashi, et al., "A High Lithium Ion Conductivity of Sulfide-base Glass Ceramic Solid Electrolytes", vol. 75, No. 4, pp. 351-354 (2005) (with English translation of Figure 1).

Office Action issued Nov. 30, 2011 in Taiwanese Patent Application No. 094103459 (with English translation of category of cited documents).

Hellmut Eckert, et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR", Chem. Mater. 1990, 2, pp. 273-279.

Zhengming Zhang, et al., "Synthesis and Characterization of the $B_2S_3$—$Li_2S$, the $P_2S_5$—$Li_2S$ and the $B_2S_3$—$P_2S_5$—$Li_2S$ Glass Systems", Solid State Ionics, vol. 38, Issues 3-4, May 1990, pp. 217-224.

Zhengming Zhang, et al., "Glass Formation and Structure in Non-Oxide Chalcogenide Systems. The Short Range Order of $Ag_2S$—$P_2S_5$ Glasses Studied by $^{31}P$ MAS-NMR and Dipolar NMR Techniques", Journal of the American Chemical Society, vol. 114, No. 14, 1992, pp. 5775-5784.

Mizuno et al, "High lithium ion conducting glass-ceramics in the system $Li_2S$—$P_2S_5$", *Solid State Ionics*, vol. 177, (2006), pp. 2721-2725.

Yamane et al, "Crystal structure of a superionic conductor, $Li_7P_3S_{11}$", *Solid State Ionics*, vol. 178, (2007) pp. 1163-1167.

Mizuno et al, "New Lithium Conducting Crystal Obtained by Crystallization of the $Li_2S$—$P_2S_5$ Glasses", *Electrochem. Solid State Lett.*, 2005, vol. 8, Issue 11, pp. A603-A606.

Komatsu, "New Development in Crystallized Glasses", *New Glass*, 2005, vol. 20(3), pp. 3-8, (w/certified partial English translation).

\* cited by examiner

LITHIUM ION CONDUCTING SULFIDE BASED CRYSTALLIZED GLASS AND METHOD FOR PRODUCTION THEREOF

TECHNICAL FIELD

The invention relates to a lithium-ion-conducting sulfide-based crystallized glass, a method of producing the same, and a solid electrolyte and an all-solid battery using the sulfide-based crystallized glass.

BACKGROUND ART

An electrolyte exhibiting high lithium-ion-conducting properties at room temperature is generally limited to a liquid electrolyte. For example, an organic electrolytic solution is known as a material exhibiting high lithium-ion-conducting properties at room temperature.

A lithium-ion-conducting $Li_3N$-based ceramic is also known which exhibits a high conductivity of $10^{-3}$ $Scm^{-1}$ or more at room temperature.

However, a known organic electrolytic solution is inflammable since it contains an organic solvent. Therefore, leakage or ignition may occur when using an ion-conductive material containing an organic solvent as an electrolyte for a cell.

Moreover, since conduction of not only lithium ions but also counter anions occurs in a liquid electrolyte, the lithium ion transport number is not "1".

Since a known lithium-ion-conducting $Li_3N$-based ceramic has a low decomposition voltage, it is difficult to form an all-solid battery which is operated at 3 V or more using such a ceramic.

To deal with this problem, a sulfide-based crystallized glass has been disclosed which contains 50 to 92.5 mol % of $Li_2S$ and 7.5 to 50 mol % of $P_2S_5$, has a crystallization rate of 30 to 99%, and contains a glassy phase containing $Li_2S$ and $P_2S_5$ as the major components and a crystalline phase containing at least one compound selected from the group consisting of $Li_7PS_6$, $Li_4P_2S_6$, and $Li_3PS_4$ (see JP-A-2002-109955, for example).

This sulfide-based crystallized glass exhibits high lithium-ion-conducting properties at room temperature.

However, this crystallized glass is heated at 500° C. or more during production and therefore requires special equipment for production on an industrial scale. Moreover, since a high ionic conductivity is obtained when the amount of $Li_2S$ is 80 mol % and the amount of $P_2S_5$ is 20 mol %, a large amount of expensive Li is used as a source.

Therefore, since the production cost of the material is increased, the above crystallized glass is not necessarily satisfactory from an economical point of view.

In addition, a material exhibiting higher lithium-ion-conducting properties has been demanded in order to improve the efficiency of a lithium rechargeable battery using a sulfide-based crystallized glass.

The invention was achieved in view of the above-described problems. An object of the invention is to provide a sulfide-based crystallized glass which exhibits high lithium-ion-conducting properties at room temperature, allows production on an industrial scale due to a decrease in the heat treatment temperature and a decrease in the amount of Li used as a source, and is satisfactory from an economical point of view.

DISCLOSURE OF THE INVENTION

In order to solve the above subject, the inventors of the invention have conducted extensive studies on the technology disclosed in JP-A-2002-109955. As a result, the inventors found that a sulfide-based crystallized glass shows a novel crystal structure at a low heat treatment temperature and a composition in which the amount of Li used as a source is relatively small and that this crystal structure provides the crystallized glass with remarkably excellent lithium-ion-conducting properties. This finding has led to the completion of the invention.

According to the invention, the following lithium-ion-conducting sulfide-based crystallized glass, a method of producing the same, and a solid electrolyte and all-solid battery using the same can be provided.

1. A lithium-ion-conducting sulfide-based crystallized glass comprising: lithium (Li), phosphorus (P), and sulfur (S) elements, wherein the crystallized glass has diffraction peaks at 2θ=17.8±0.3 deg, 18.2±0.3 deg, 19.8±0.3 deg, 21.8±0.3 deg, 23.8±0.3 deg, 25.9±0.3 deg, 29.5±0.3 deg, and 30.0±0.3 deg in X-ray diffraction (CuKα: λ=1.5418 Å).

2. A method of producing a lithium-ion-conducting sulfide-based crystallized glass comprising heat-treating a sulfide-based glass comprising 68 to 74 mol % of $Li_2S$ and 26 to 32 mol % of $P_2S_5$ at 150 to 360° C.

3. The method according to 2, wherein the $Li_2S$ is prepared by reacting lithium hydroxide with hydrogen sulfide in an aprotic organic solvent to produce crude $Li_2S$ and purifying the crude $Li_2S$ by cleaning with an organic solvent at 100° C. or more.

4. The method according to 2 or 3, wherein the total amount of sulfur oxides contained in the $Li_2S$ is 0.15 mass % or less and the amount of lithium N-methylaminobutyrate (LMAB) is 0.1 mass % or less.

5. The method according to any of 2 to 4, wherein phosphorus (P) and sulfur (S) at a molar ratio corresponding to $P_2S_5$ are used instead of the $P_2S_5$.

6. The method according to any of 2 to 5, wherein the sulfide-based glass is produced from $Li_2S$ and $P_2S_5$ or phosphorus (P) and sulfur (S) by a mechanical milling method.

7. A lithium-ion-conducting sulfide-based crystallized glass produced by the method according to any of 2 to 6.

8. A solid electrolyte for a lithium rechargeable battery comprising the lithium-ion-conducting sulfide-based crystallized glass according to 1 or 7 as a material.

9. An all-solid battery comprising the solid electrolyte according to 8.

Since the sulfide-based crystallized glass and the production method according to the invention can reduce the heat treatment temperature to be in a range as low as 150 to 360° C. and reduce the amount of Li used as a source, the production of the sulfide-based crystallized glass on an industrial scale is enabled and the economy is excellent.

Since the sulfide-based crystallized glass exhibits extremely high lithium-ion-conducting properties at room temperature, the performance of a lithium rechargeable battery using the sulfide-based crystallized glass can be improved.

BEST MODE FOR CARRYING OUT THE INVENTION

Figure 1:
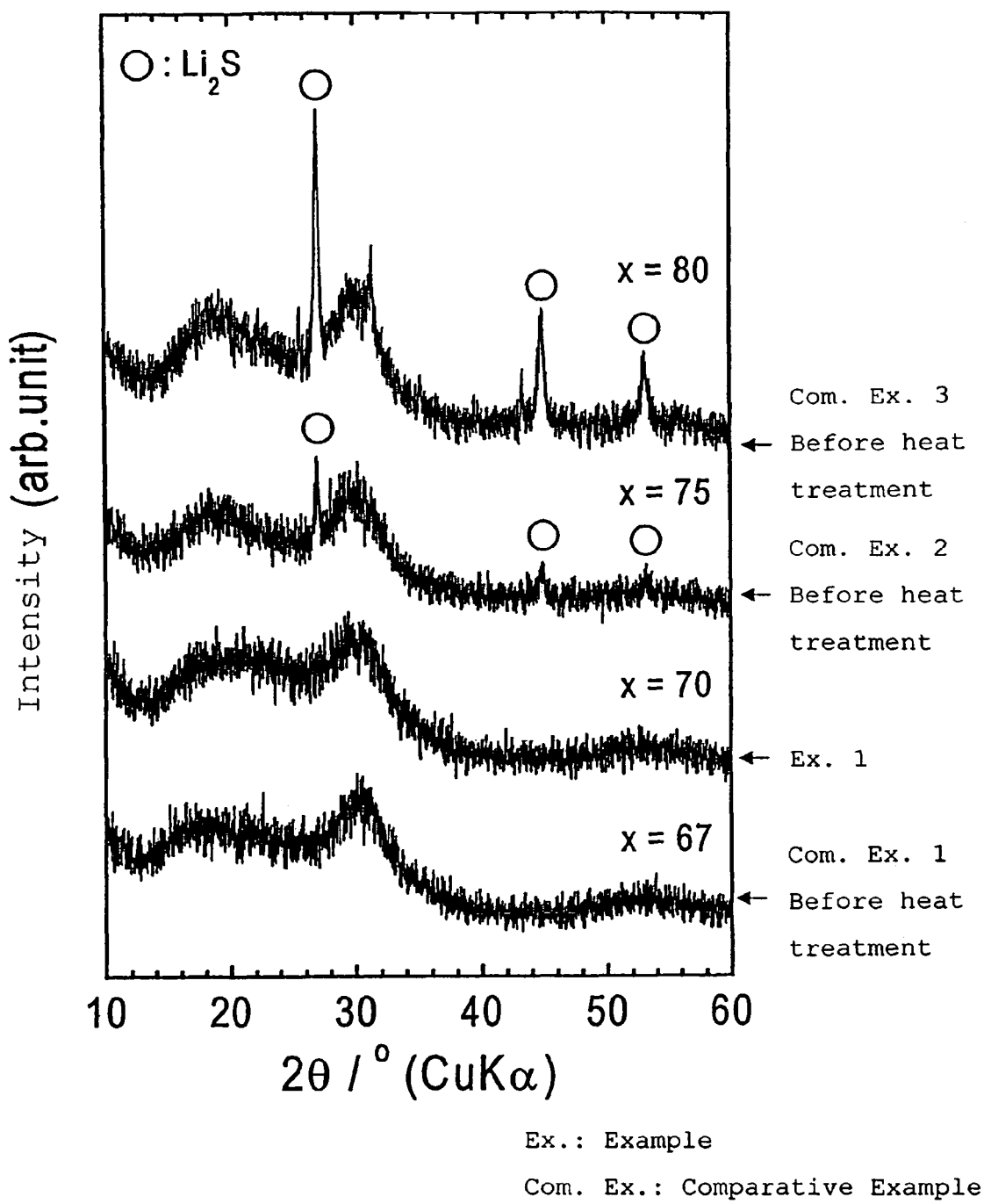
FIG. 1 shows X-ray diffraction spectrum charts for sulfide-based glasses obtained in Example 1 and Comparative Examples 1 to 3.

The invention is described below in detail.

A lithium-ion-conducting sulfide-based crystallized glass according to the invention includes lithium, phosphorus, and sulfur elements, wherein the crystallized glass has diffraction peaks at $2\theta=17.8\pm0.3$ deg, $18.2\pm0.3$ deg, $19.8\pm0.3$ deg, $21.8\pm0.3$ deg, $23.8\pm0.3$ deg, $25.9\pm0.3$ deg, $29.5\pm0.3$ deg, and $30.0\pm0.3$ deg in X-ray diffraction (CuK$\alpha$: $\lambda=1.5418$ Å).

A crystal structure having diffraction peaks in the above eight regions has not yet been observed. This indicates that the sulfide-based crystallized glass has a novel crystal structure. The invention was achieved based on the finding that the sulfide-based crystallized glass having such a crystal structure exhibits extremely high lithium-ion-conducting properties.

The above crystal structure can be obtained by heat-treating a sulfide-based glass including 68 to 74 mol % of $Li_2S$ and 26 to 32 mol % of $P_2S_5$ at 150 to 360° C.

As $Li_2S$ used as the starting material, $Li_2S$ may be used which is prepared by reacting lithium hydroxide with hydrogen sulfide in an aprotic organic solvent to produce crude $Li_2S$ and purifying the crude $Li_2S$ by cleaning with an organic solvent at 100° C. or more.

In more detail, it is preferable to produce $Li_2S$ by a production method disclosed in JP-A-7-330312, and to purify the $Li_2S$ by a method disclosed in Japanese Patent application No. 2003-363403.

According to this method for producing $Li_2S$, since high-purity lithium sulfide can be obtained by a simple means, the raw material cost of the sulfide-based crystallized glass can be reduced. According to the above purification method, since sulfur oxides and lithium N-methylaminobutyrate (hereinafter abbreviated as "LMAB") which are impurities contained in $Li_2S$ can be removed by a simple treatment, it is advantageous from an economical point of view. Moreover, a solid electrolyte for a lithium rechargeable battery using the high-purity lithium sulfide obtained can suppress a decrease in performance due to low purity, whereby an excellent lithium rechargeable battery (solid-state battery) can be obtained.

It is preferable that the total amount of sulfur oxides contained in the $Li_2S$ be 0.15 mass % or less and the amount of LMAB contained in the $Li_2S$ be 0.1 mass % or less.

$P_2S_5$ which is industrially produced and sold may be used without specific limitations.

Phosphorus (P) and sulfur (S) may be used at a molar ratio corresponding to $P_2S_5$ instead of $P_2S_5$. This allows the sulfide-based crystallized glass according to the invention to be produced using easily available and inexpensive materials. As phosphorus (P) and sulfur (S), those industrially produced and sold may be used without specific limitations.

The sulfide-based crystallized glass according to the invention includes 68 to 74 mol % of $Li_2S$ and 26 to 32 mol % of $P_2S_5$. If the mixing ratio is outside this range, the crystal structure specific to the invention is not obtained, whereby the ionic conductivity is decreased and the resulting sulfide-based crystallized glass exhibits insufficient performance as a solid electrolyte. It is preferable that the blending amount of $Li_2S$ be 68 to 73 mol % and the blending amount of $P_2S_5$ be 27 to 32 mol %.

Starting materials may contain at least one sulfide selected from the group consisting of $Al_2S_3$, $B_2S_3$, $GeS_2$, and $SiS_2$ in addition to $P_2S_5$ and $Li_2S$ insofar as the crystal structure of the crystallized glass according to the invention can be obtained. The addition of such a sulfide allows the production of more stable glass when producing the sulfide-based crystallized glass.

Similarly, starting materials may contain at least one lithium orthooxo acid salt selected from the group consisting of $Li_3PO_4$, $Li_4SiO_4$, $Li_4GeO_4$, $Li_3BO_3$, and $Li_3AlO_3$ in addition to $Li_2S$ and $P_2S_5$. The addition of such a lithium orthooxo acid salt stabilizes the glass in the crystallized glass.

Further, starting materials may contain at least one of the above-mentioned sulfides and at least one of the above-mentioned lithium orthooxo acid salts in addition to $Li_2S$ and $P_2S_5$.

As a method for producing sulfide-based glass using a mixture of the above-mentioned starting materials, a mechanical milling treatment (hereinafter may be called "MM treatment") or a melt-quenching method can be given, for example.

The glass formation region can be increased by producing sulfide-based glass using the MM treatment. Moreover, the MM treatment can be performed at room temperature since the heat treatment performed in the melt-quenching method becomes unnecessary, whereby the production process can be simplified.

When producing sulfide-based glass by the melt-quenching method or the MM treatment, it is preferable to use an inert gas atmosphere such as nitrogen. This is because steam, oxygen, or the like easily reacts with the starting materials.

In the MM treatment, it is preferable to use a ball mill. A large amount of mechanical energy can be produced by using the ball mill.

As the ball mill, it is preferable to use a planetary ball mill. The planetary ball mill, in which a pot rotates on its own axis and a plate revolves, can efficiently generate an extremely high impact energy.

The conditions for the MM process may be arbitrarily adjusted depending on the instrument used and the like. The production rate of the sulfide-based glass increases as the rotational speed increases, and the conversion rate of the raw materials into the sulfide-based glass increases as the rotational time increases. For example, when using a general planetary ball mill, the rotational speed may be several tens to several hundreds rotations per minute, and the treatment time may be 0.5 to 100 hours.

The sulfide-based glass obtained is crystallized by heat treatment to give a lithium-ion-conducting sulfide-based crystallized glass according to the invention. The heat treatment temperature is set at 150 to 360° C. If the heat treatment temperature is less than 150° C., which is equal to or lower than the glass transition temperature of the sulfide-based glass, crystallization does not proceed. If the heat treatment temperature is more than 360° C., the resulting crystal glass does not have the crystal structure specific to the invention, but has a crystal structure disclosed in JP-A-2002-109955. The heat treatment temperature is preferably set at 200 to 350° C. The heat treatment time is not particularly limited insofar as a crystal is produced. The heat treatment time may be extremely short or may be long. In addition, the temperature rise pattern up to the heat treatment temperature is not particularly limited.

The sulfide-based crystallized glass according to the invention has a decomposition voltage of at least 5 V and exhibits extremely high lithium-ion-conducting properties on the order of $10^{-3}$ Scm$^{-1}$ at room temperature, which has not been reported, while being nonflammable inorganic solid and having a lithium ion transport number of "1". Therefore, the sulfide-based crystallized glass according to the invention is extremely suitable as a material for a solid electrolyte for a lithium battery.

An all-solid battery using a solid electrolyte according to the invention having the above-described characteristics has a high energy density and exhibits excellent safety and charge-discharge cycle characteristics.

EXAMPLES

The invention is described below in more detail by way of examples.

Production Example (1) Production of Lithium Sulfide ($Li_2S$)

Lithium sulfide was produced by a first aspect method (two step method) disclosed in JP-A-7-330312. Specifically, a 10-liter autoclave equipped with a stirring blade was charged with 3326.4 g (33.6 mol) of N-methyl-2-pyrrolidone (NMP) and 287.4 g (12 mol) of lithium hydroxide. The mixture was then heated to 130° C. with stirring at 300 rpm. Then, hydrogen sulfide was bubbled into the solution for two hours at a supply rate of 3 l/min. The temperature of the reaction solution was increased in a nitrogen stream (200 cc/min) to desulfurize and hydrogenate part of the hydrogen sulfide reacted. Water produced during the reaction between hydrogen sulfide and lithium hydroxide as a by-product started to vaporize as the temperature of the reaction mixture was increased. The water was condensed using a condenser and removed from the system. The temperature of the reaction mixture increased when water was removed from the system. The increase in temperature was stopped when the temperature reached 180° C., and the system was maintained at a constant temperature. After completion of removal of hydrogen sulfide (about 80 minutes), the reaction was terminated to obtain lithium sulfide.

(2) Purification of Lithium Sulfide

After decanting the NMP in 500 mL of the slurry reaction solution (NMP-lithium sulfide slurry) obtained in (1), 100 mL of dehydrated NMP was added. The mixture was stirred at 105° C. for about one hour. The NMP was then decanted at 105° C. After the addition of 100 mL of NMP, the mixture was stirred at 105° C. for about one hour. The NMP was then decanted at 105° C. The same procedure was repeatedly performed four times in total. After completion of decantation, the lithium sulfide was dried at 230° C. (temperature equal to or higher than the boiling point of NMP) for three hours in a nitrogen stream under normal pressure. The impurity content of the lithium sulfide obtained was measured.

The content of sulfur oxides (lithium sulfite($Li_2SO_3$), lithium sulfate ($Li_2SO_4$), and lithium thiosulfate ($Li_2S_2O_3$)) and lithium N-methylaminobutyrate (LMAB) was determined by ion chromatography. As a result, the total content of the sulfur oxides was 0.13 mass %, and the content of LMAB was 0.07 mass %.

$Li_2S$ thus purified was used in the following examples and comparative examples.

Example 1

$Li_2S$ produced in the above production example and $P_2S_5$ (manufactured by Aldrich) were used as starting materials. About 1 g of a mixture prepared by mixing $Li_2S$ and $P_2S_5$ at a molar ratio of 70:30 and ten alumina balls having a diameter of 10 mm were placed in an alumina container (45 mL). The contents of the container were subjected to a mechanical milling treatment in nitrogen at room temperature (25° C.) and a rotational speed of 370 rpm for 20 hours using a planetary ball mill ("P-7" manufactured by Fritsch) to obtain sulfide-based glass as a white yellow powder.

The resulting powder was subjected to X-ray powder diffraction measurement (CuKα: λ=1.5418 Å). FIG. 1 shows the X-ray diffraction spectrum chart. FIG. 1 also shows spectra of Comparative Examples 1 to 3 described later.

Since the chart of the powder of Example 1 has a broad shape specific to an amorphous material, it was confirmed that the powder was vitrified (amorphized).

The powder (sulfide-based glass) was heat-treated in the temperature range from room temperature (25° C.) to 260° C. in nitrogen to obtain sulfide-based crystallized glass. The powder was subjected to differential thermal analysis during the heat treatment.

The temperature rise and decrease rate was set at 10° C./min. After increasing the temperature to 260° C., the temperature was decreased to room temperature.

As a result of differential thermal analysis, an exothermic peak due to crystallization of the amorphous material was observed at 230 to 240° C. Therefore, it was confirmed that the amorphous material was changed into crystallized glass at 230 to 240° C.

Figure 2:
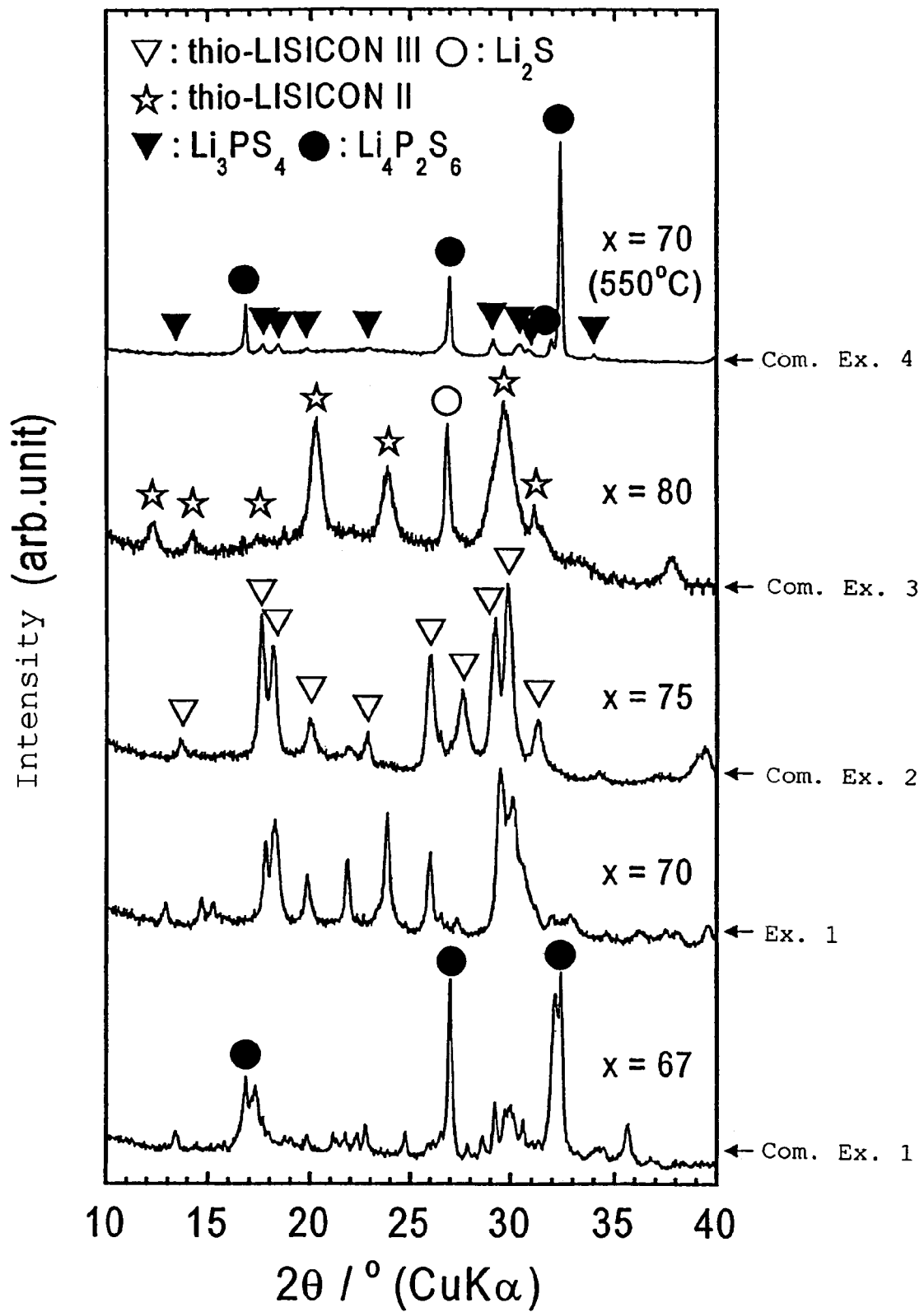
FIG. 2 shows X-ray diffraction spectrum charts for sulfide-based crystallized glass samples obtained in Example 1 and Comparative Examples 1 to 4.

The resulting sulfide-based crystallized glass was subjected to X-ray powder diffraction measurement (CuKα: λ=1.5418 Å). FIG. 2 shows the X-ray diffraction spectrum chart of the sulfide-based crystallized glass. FIG. 2 also shows spectra of Comparative Examples 1 to 4 described later.

As is clear from FIG. 2, it was confirmed that the crystallized glass had diffraction peaks at 2θ=17.8 deg, 18.2 deg, 19.8 deg, 21.8 deg, 23.8 deg, 25.9 deg, 29.5 deg, and 30.0 deg, and had a crystal phase differing from those of known $Li_7PS_6$, $Li_4P_2S_6$, and $Li_3PS_4$.

Example 2

The sulfide-based glass (powder before the heat treatment) obtained in Example 1 was processed into a pellet-shaped formed product (diameter: about 10 mm, thickness: about 1 mm).

The ionic conductivity of the formed product was measured during the heat treatment. Specifically, carbon paste was applied to the formed product as electrodes, and the ionic conductivity was measured by an alternating current two-terminal method.

The sulfide-based glass was heat-treated (ionic conductivity was also measured) by increasing the temperature from room temperature (25° C.) to about 250° C. and then decreasing the temperature to room temperature. The temperature was increased or decreased in about three hours, for each case.

Figure 3:
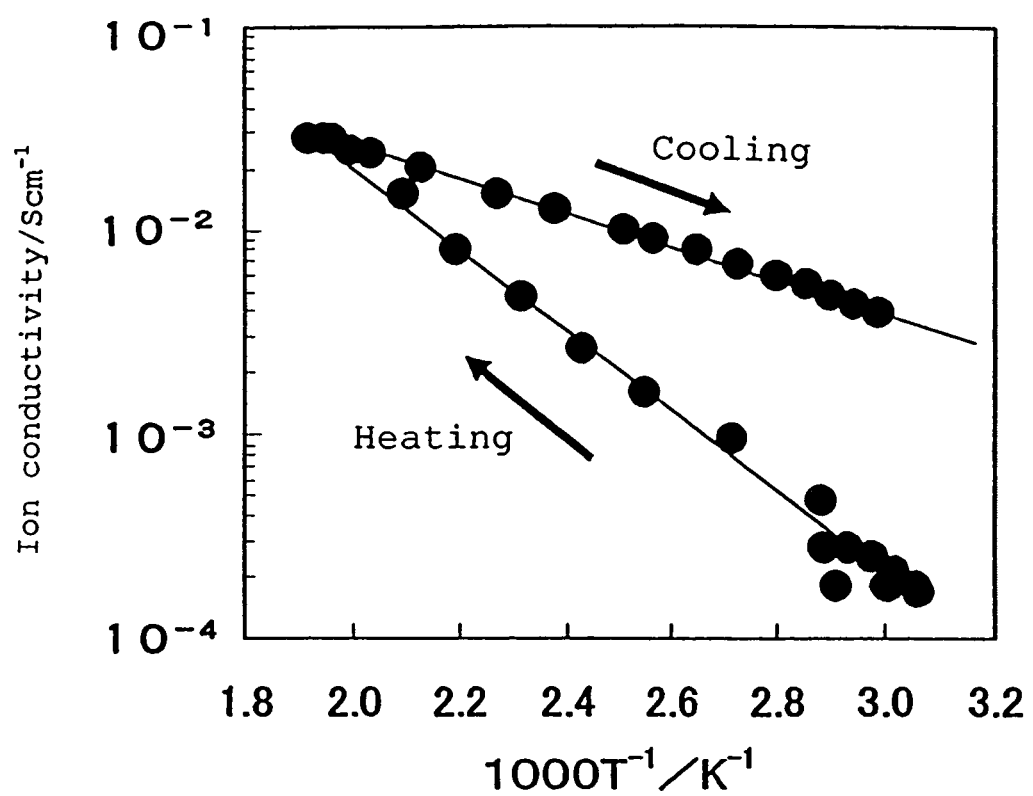
FIG. 3 is a view showing measurement results of the ionic conductivity of a sulfide-based crystallized glass obtained in Example 2.

FIG. 3 is a view (Arrhenius plot) showing the measurement results of the ionic conductivity of the sulfide-based crystallized glass.

The ionic conductivity of the resulting sulfide-based crystallized glass was $2.1 \times 10^{-3}$ Scm$^{-1}$ at room temperature (25° C.). The value was the greatest for electrolytes of the elements (Li, P, and S) used.

The sample after the measurement was subjected to X-ray powder diffraction measurement. As a result, a diffraction peak pattern similar to that of Example 1 was obtained.

The heat treatment temperatures of Example 2 and the following examples and comparative examples, and the X-ray diffraction peak, crystal structure, and ionic conductivity of the sulfide-based crystallized glass obtained in each example are shown in Table 1.

TABLE 1

| | Composition ratio (mol %) $Li_2S:P_2S_5$ | Heat treatment condition | X-ray diffraction peak (deg) | Crystalline phase | Ionic conductivity $(Scm^{-1})$ |
|---|---|---|---|---|---|
| Example 2 | 70:30 | Temperature was rised up to 250° C. | 17.8, 18.2, 19.8, 21.8, 23.8, 25.9, 29.5, 30.0 (see FIG. 2) | New | $2.1 \times 10^{-3}$ |
| Example 3 | 68:32 | up to 260° C. | Same as above (see FIG. 2) | New | $1.0 \times 10^{-3}$ |
| Example 4 | 73:27 | up to 260° C. | Same as above (see FIG. 2) | New | $1.3 \times 10^{-3}$ |
| Comparative Example 1 | 67:33 | up to 260° C. | See FIG. 2 | $Li_4P_2S_6$ | $9.0 \times 10^{-5}$ |
| Comparative Example 2 | 75:25 | up to 260° C. | See FIG. 2 | Thio-LISICON III* | $3.0 \times 10^{-4}$ |
| Comparative Example 3 | 80:20 | up to 260° C. | See FIG. 2 | Thio-LISICON II* | $7.4 \times 10^{-4}$ |
| Comparative Example 4 | 70:30 | up to 550° C. | See FIG. 2 | $Li_3PS_4$ $Li_4P_2S_6$ | $1.5 \times 10^{-6}$ |

*See Electromechanical Communication 5 (2003), 111 to 114

Example 3

Crystallized glass was obtained in the same manner as in Example 1 except for changing the molar ratio of $Li_2S$ and $P_2S_5$ to 68:32.

The crystallized glass obtained had X-ray diffraction peaks similar to that of Example 1. The ionic conductivity measured in the same manner as in Example 2 was $1.0 \times 10^{31\ 3}$ Scm$^{-1}$.

Example 4

Crystallized glass was obtained in the same manner as in Example 1 except for changing the molar ratio of $Li_2S$ and $P_2S_5$ to 73:27.

The resulting crystallized glass had X-ray diffraction peaks similar to that of Example 1. The ionic conductivity measured in the same manner as in Example 2 was $1.3 \times 10^{-3}$ Scm$^{-1}$.

Comparative Example 1

Sulfide-based crystallized glass was obtained in the same manner as in Example 1 except for changing the molar ratio of $Li_2S$ and $P_2S_5$ to 67:33. The ionic conductivity was measured in the same manner as in Example 2.

Comparative Example 2

Sulfide-based crystallized glass was obtained in the same manner as in Example 1 except for changing the molar ratio of $Li_2S$ and $P_2S_5$ to 75:25. The ionic conductivity was measured in the same manner as in Example 2.

Comparative Example 3

Sulfide-based crystallized glass was obtained in the same manner as in Example 1 except for changing the molar ratio of $Li_2S$ and $P_2S_5$ to 80:20. The ionic conductivity was measured in the same manner as in Example 2.

Comparative Example 4

Sulfide-based crystallized glass was obtained in the same manner as in Example 1 except for changing the maximum temperature during heat treatment from 250° C. to 550° C. The ionic conductivity was measured in the same manner as in Example 2.

As shown in FIG. 2, it was confirmed that the sulfide-based crystallized glasses obtained in Comparative Examples 1 to 4 did not show diffraction peaks specific to the crystallized glass according to the invention.

From the ionic conductivity measurement results of the examples and the comparative examples shown in Table 1, it was confirmed that the sulfide-based crystallized glass according to the invention exhibits an extremely high ionic conductivity in comparison with known sulfide-based crystallized glass.

INDUSTRIAL APPLICABILITY

The sulfide-based crystallized glass according to the invention has a decomposition voltage of at least 5 V and exhibits lithium-ion-conducting properties as extremely high as the order of $10^{-3}$ Scm$^{-1}$ at room temperature, which has not been reported, while being nonflammable inorganic solid and having a lithium ion transport number of 1. Therefore, the sulfide-based crystallized glass according to the invention is extremely suitable as a material for a solid electrolyte for a lithium battery.

Since the production method according to the invention can reduce a heat treatment temperature to 150 to 360° C. and reduce the amount of Li used as a source, the production method according to the invention allows production on an industrial scale and reduces cost.

An all-solid battery using the solid electrolyte according to the invention having the above-described characteristics has a high energy density and exhibits excellent safety and charge-discharge cycle characteristics.

The invention claimed is:

1. A lithium-ion-conducting sulfide-based crystallized glass comprising: lithium (Li), phosphorus (P), and sulfur (S) elements in a molar ratio of $Li_2S:P_2S_5$ of from 68 to 74:26 to 32 in terms of $Li_2S$ and $P_2S_5$,
    wherein the crystallized glass has diffraction peaks at 2θ=17.8±0.3 deg, 18.2±0.3 deg, 19.8±0.3deg, 21.8±0.3 deg, 23.8±0.3 deg, 25.9±0.3 deg, 29.5±0.3 deg and 30.0±0.3 deg in X-ray diffraction, wherein CuKα: λ=1.5418 Å.

2. A solid electrolyte for a lithium rechargeable battery comprising the lithium-ion-conducting sulfide-based crystallized glass according to claim 1 as a material.

3. An all-solid battery comprising the solid electrolyte according to claim 2.

4. The lithium-ion-conducting sulfide-based crystallized glass according to claim 1, which is prepared by a heat-treatment of a glass formed from a raw material comprising from 68 to 74 mol % of $Li_2S$ and from 26 to 32 mol % of $P_2S_5$.

5. The lithium-ion-conducting sulfide-based crystallized glass according to claim 1, which is prepared by a heat-treatment of a glass formed from a raw material comprising from 68 to 73 mol % of $Li_2S$ and from 27 to 32 mol % of $P_2S_5$.

6. The lithium-ion-conducting sulfide-based crystallized glass according to claim 1, wherein the molar ratio of $Li_2S:P_2S_5$ is from 68 to 73 to 27 to 32 in terms of $Li_2S$ and $P_2S_5$.

7. The lithium-ion-conducting sulfide-based crystallized glass according to claim 1, wherein the diffraction peaks at $2\theta=17.8\pm0.3$ deg, $18.2\pm0.3$ deg, $19.8\pm0.3$ deg, $21.8\pm0.3$ deg, $23.8\pm0.3$ deg, $25.9\pm0.3$ deg, $29.5\pm0.3$ deg and $30.0\pm0.3$ deg in X-ray diffraction show that the crystallized glass has a crystal phase different from crystal phases of $Li_7PS_6$, $Li_4P_2S_6$ and $Li_3PS_4$.

8. A method of producing a lithium-ion-conducting sulfide-based crystallized glass, the method comprising:
preparing a mixture comprising 68 to 74 mol % of $Li_2S$ and 26 to 32 mol % of $P_2S_5$ and forming a sulfide-based glass from the mixture, and heat-treating the sulfide-based glass at 230 to 360° C., thereby producing the crystallized glass.

9. The method according to claim 8, wherein the $Li_2S$ is prepared by reacting lithium hydroxide with hydrogen sulfide in an aprotic organic solvent to produce crude $Li_2S$ and purifying the crude $Li_2S$ by cleaning with an organic solvent at 100° C. or more.

10. The method according to claim 8, wherein the total amount of sulfur oxides contained in the $Li_2S$ is 0.15 mass % or less and the amount of lithium N-methylaminobutyrate (LMAB) is 0.1 mass % or less.

11. The method according to claim 8, wherein phosphorus (P) and sulfur (S) at a molar ratio corresponding to $P_2S_5$ are used instead of the $P_2S_5$.

12. A lithium-ion-conducting sulfide-based crystallized glass produced by the method according to claim 11.

13. The method according to claim 8, wherein the sulfide-based glass is produced from $Li_2S$ and $P_2S_5$ or phosphorus (P) and sulfur (S) by a mechanical milling process.

14. A lithium-ion-conducting sulfide-based crystallized glass produced by the method according to claim 8.

15. A solid electrolyte for a lithium rechargeable battery comprising the lithium-ion-conducting sulfide-based crystallized glass according to claim 14 as a material.

16. An all-solid battery comprising the solid electrolyte according to claim 15.

17. A lithium-ion-conducting sulfide-based crystallized glass comprising: lithium (Li), phosphorus (P), and sulfur (S) elements in a molar ratio of $Li_2S:P_2S_5$ of from 68 to 74:26 to 32 in terms of $Li_2S$ and $P_2S_5$,
wherein the crystallized glass has diffraction peaks at $2\theta=17.8\pm0.3$ deg, $18.2\pm0.3$ deg, $19.8\pm0.3$ deg, $21.8\pm0.3$ deg, $23.8\pm0.3$ deg, $25.9+0.3$ deg, $29.5\pm0.3$ deg and $30.0\pm0.3$ deg in X-ray diffraction, wherein CuKα: $\lambda=1.5418$ Å,
wherein the crystallized glass is obtained a method comprising heat-treating the sulfide-based glass at a temperature in a range from 230 to 360° C., wherein the heat-treating temperature is equal or higher than the crystallization temperature of the sulfide-based glass, thereby producing the crystallized glass.

18. The lithium-ion-conducting sulfide-based crystallized glass according to claim 17, wherein the diffraction peaks at $2\theta=17.8+0.3$ deg, $18.2\pm0.3$ deg, $19.8\pm0.3$ deg, $21.8\pm0.3$ deg, $23.8\pm0.3$ deg, $25.9\pm0.3$ deg, $29.5\pm0.3$ deg and $30.0\pm0.3$ deg in X-ray diffraction show that the crystallized glass has a crystal phase different from crystal phases of $Li_7PS_6$, $Li_4P_2S_6$ and $Li_3PS_4$.

* * * * *